(12) United States Patent
Sun et al.

(10) Patent No.: US 11,478,108 B2
(45) Date of Patent: Oct. 25, 2022

(54) INTELLIGENT IDENTIFICATION COOKING SYSTEM FOR OVEN

(71) Applicant: SOUTH CHINA UNIVERSITY OF TECHNOLOGY, GuangdongC (CN)

(72) Inventors: Dawen Sun, Guangzhou (CN); Zhong Han, Guangzhou (CN); Xucong Yu, Guangzhou (CN); Hongbin Pu, Guangzhou (CN); Zhiwei Zhu, Guangzhou (CN); Qijun Wang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 72 days.

(21) Appl. No.: 17/053,693

(22) PCT Filed: Oct. 25, 2018

(86) PCT No.: PCT/CN2018/111946
§ 371 (c)(1),
(2) Date: Nov. 6, 2020

(87) PCT Pub. No.: WO2019/214171
PCT Pub. Date: Nov. 14, 2019

(65) Prior Publication Data
US 2021/0186262 A1 Jun. 24, 2021

(30) Foreign Application Priority Data
May 8, 2018 (CN) .......................... 201810430869.8

(51) Int. Cl.
*A47J 37/06* (2006.01)

(52) U.S. Cl.
CPC ....... *A47J 37/0629* (2013.01); *A47J 37/0664* (2013.01); *G05B 2219/2643* (2013.01)

(58) Field of Classification Search
CPC .............. A47J 37/0629; A47J 37/0664; G05B 2219/2643
See application file for complete search history.

(56) References Cited

U.S. PATENT DOCUMENTS

| 2006/0081135 A1* | 4/2006 | Britton ..................... A21B 7/00 99/486 |
| 2011/0033584 A1* | 2/2011 | Bilchinsky ............. A23B 4/012 426/643 |

(Continued)

FOREIGN PATENT DOCUMENTS

| CN | 103347111 A | 10/2013 |
| CN | 104042124 A | 9/2014 |

(Continued)

*Primary Examiner* — Thien S Tran
(74) *Attorney, Agent, or Firm* — Loza & Loza, LLP; Michael F. Fedrick (57) ABSTRACT

An intelligent identification cooking system of an oven including an image acquisition system, an image analysis and processing system, and a temperature measurement and monitoring system. The image acquisition system is connected to the image analysis and processing system and an intelligent menu control system is connected to the image analysis and processing system and the temperature measurement and monitoring system respectively. Through computer vision and identification technology and temperature sensing technology, parameters such as the type, thickness, size, fattiness and temperature are identified and automatically matched and calibrated to a cooking menu. A control program is output to a control terminal and executed.

10 Claims, 3 Drawing Sheets

(56) References Cited

U.S. PATENT DOCUMENTS

| | | | |
|---|---|---|---|
| 2011/0122254 A1* | 5/2011 | Ishii | G03B 13/36 |
| | | | 348/169 |
| 2013/0306627 A1* | 11/2013 | Libman | H05B 6/705 |
| | | | 219/709 |
| 2016/0327281 A1* | 11/2016 | Bhogal | A23L 5/15 |
| 2017/0074522 A1* | 3/2017 | Cheng | H05B 6/6441 |
| 2017/0115008 A1* | 4/2017 | Erbe | F24C 7/085 |
| 2017/0170978 A1* | 6/2017 | Luckhardt | F24C 15/023 |
| 2018/0292092 A1* | 10/2018 | Bhogal | F24C 7/087 |
| 2018/0324908 A1* | 11/2018 | Denker | G06V 10/40 |
| 2019/0086096 A1* | 3/2019 | Koetz | H05B 6/6447 |
| 2019/0110638 A1* | 4/2019 | Li | G06N 20/00 |
| 2019/0128531 A1* | 5/2019 | Abdoo | F27D 21/0014 |

FOREIGN PATENT DOCUMENTS

| | | |
|---|---|---|
| CN | 104246375 A | 12/2014 |
| CN | 104508383 A | 4/2015 |
| CN | 107535024 A | 1/2018 |
| CN | 107678278 A | 2/2018 |
| JP | H0544941 A | 2/1993 |
| JP | 2000154921 A | 6/2000 |
| JP | 2016020833 A | 2/2016 |

\* cited by examiner

INTELLIGENT IDENTIFICATION COOKING SYSTEM FOR OVEN

CROSS-REFERENCE TO RELATED APPLICATIONS

This application is the U.S. national stage of International Patent Application No. PCT/CN2018/111946, filed on Oct. 25, 2018 and entitled INTELLIGENT IDENTIFICATION COOKING SYSTEM FOR OVEN, which claims the benefit of priority under 35 U.S.C. § 119 from Chinese Patent Application No. 201810430869.8, filed May 8, 2018. The disclosures of the foregoing applications are incorporated herein by reference in their entirety.

TECHNICAL FIELD

The invention relates to an intelligent identification cooking system of an oven, in particular to an intelligent identification of a type, a thickness, a size, fattiness, a temperature and other parameters of a steak by using computer vision and identification technology, and temperature sensing technology in an oven. A cooking menu is automatically matched and calibrated, and a control program is output to a control terminal for execution, so as to realize an intelligent cooking system.

TECHNICAL BACKGROUND

When using a traditional oven to bake steak-type food, users need to comprehensively evaluate some of characteristic parameters that affect its cooking curve, and combine the requirements for the degree of rawness to set the baking conditions of the oven (mainly output power or baking temperature and time), then perform cooking. In this way, users are required to make a more accurate assessment of the main characteristics and parameters that affect the cooking curve of steak-type food in order to obtain an ideal cooking effect.

The characteristics and parameters that have a greater influence on the cooking curve of steak-type food mainly comprise a type, a size/weight, a thickness, fattiness and an initial temperature of the steak. If the comprehensive evaluation of these parameters by the users has a large deviation, it will affect the cooking effect, causing insufficient or excessive baking, resulting in overly raw or burnt effect, or even inedible. Existing ovens are generally with fixed programs. When consumers use them, they may lack professional knowledge and experience in baking food. It is difficult to effectively identify different steak-type ingredients to adjust cooking parameters. Further, raw materials purchased from markets vary greatly, resulting in huge differences in the food after cooking. Therefore, it is particularly important to improve the intelligence level of the oven to accurately identify the raw materials. On this basis, it is particularly important to automatically set differentiation cooking parameters to realize one-button operation by consumers and that it is especially important to get good quality control of steak-type cooking.

SUMMARY OF THE INVENTION

The purpose of the present invention is to overcome the shortcomings of the prior art and to provide an intelligent identification cooking system of an oven, a system with an intelligent identification of a type, a thickness, a size, fattiness, a temperature and other parameters of a steak by using computer vision and identification technology, and temperature sensing technology in an oven, and automatic matching and control of a cooking menu.

Using computer vision and identification technology to replace human vision and brain to perceive and analyze the characteristics of steak-type food will reduce errors caused by human judgment. Computer vision and identification technology began to develop in the early 1960s. It refers to a kind of simulation of biological vision using computers and related equipment. The three-dimensional information of the corresponding scene can be obtained by processing the collected pictures or videos. Figuratively, it is to install eyes (cameras) and brains (algorithms) on the computer so that the computer can perceive the analysis target and obtain some of its characteristic parameter information. The computer performs statistics and analysis on the obtained characteristic parameter information, classifies the analysis target, then issues instructions to a machine terminal according to the classification result. The terminal performs differentiation processing according to the classification result, and finally realizes the purpose of artificial intelligence. For the realization of computer vision and identification functions, the required hardware equipment is very simple, and only an image acquisition system (comprising a camera and a stable light source) and an image processing analysis system (processor) are needed. In addition, as long as simple and suitable algorithms are used, rapid image analysis and processing may be achieved and the configuration requirements of the image processing analysis system may be reduced. Applying computer vision and identification technology to the oven, perceiving and analyzing the characteristics of steak-type food to correspond to preset cooking menu, which is a relatively simple and easy way to realize intelligent cooking of an oven.

The Technical Solution Adopted by the Present Invention is:

An intelligent identification cooking system of an oven, mainly formed by an image acquisition system, an image analysis and processing system, and a temperature measurement and monitoring system; the image acquisition system is connected to the image analysis and processing system; an intelligent menu control system is connected to the image analysis and processing system and the temperature measurement and monitoring system respectively;

the image acquisition system is mainly formed by a camera and a light source, the camera is used to collect image information; the light source is a fixed light source which provides a stable lighting environment for the camera;

the image analysis and processing system is formed by an image analysis processor and a signal modifier; an image mode acquired by the image acquisition system is in an RGB color format; the analysis processor first converts the RGB color format into a YIQ format, where the Y value represents a brightness, the I and the Q are hue values, which represent from orange to green and from purple to yellow-green respectively; then performs calculations on YIQ values of a pixel in an image using the following formula to obtain the classification value $P_{mn}$;

$$P_{mn} = a \times Y_{mn} + b \times I_{mn} + c \times Q_{mn} + A$$

in the formula, $P_{mn}$ is a classification value of the pixel, a, b, c and A are variable parameters, $0 \leq P_{mn} \leq 1$;

by limiting a threshold of the classification value $P_{mn}$, a steak type image is segmented, and the image is divided into the following areas: an upper surface area $S_1$ of the steak type, a side area $S_2$ of the steak type, and a background $S_3$; the upper surface area $S_1$ is subdivided into a lean meat area $S_{1-1}$ and a fatty meat area $S_{1-2}$ according to the brightness value Y; then identify a type of a steak, its thickness h, its size/weight, and its fattiness;

the temperature measurement and monitoring system mainly comprises an infrared temperature sensor and a thermocouple temperature sensor, which are respectively used to measure and monitor a food surface temperature and an oven cavity temperature;

the intelligent menu control system collects signals from the image analysis and processing system and the temperature measurement system; the type of the steak obtained through analysis is matched with a preset standard cooking curve, then calibrate the standard cooking curve with the thickness, the size/weight, the fattiness and an initial temperature to obtain a calibrated cooking curve; at the same time, a cooking control program is obtained according to a rawness requirement input by a user; finally, the control program is output to a control terminal and executed to realize an intelligent cooking.

In order to further achieve the object of the present invention, preferably, the camera is directly opposite to a center position of a bakeware/grill on which food is placed, and forms an angle of 30° to 60° with a horizontal plane.

Preferably, the light source is located above an oven cavity, on the same plane as the camera and a center line of the grill/bakeware; and the light source and the camera are fixed respectively on both sides of another center line of the grill/bakeware.

Preferably, the light source is a white or yellow light source; an angle between a connecting line from the light source to a center of the bakeware/grill and a horizontal plane is 60° to 90°.

Preferably, an identification of the type of the steak is performed by limiting the threshold value of the classification value $P_{mn}$ of pixels in a surface of the lean meat area $Si_{1-1}$.

Preferably, an identification of a value of the thickness h of the steak is to identify a bottom edge of the side area $S_2$ of the steak type, and a height value of a side surface is corrected by a function of the bottom edge to obtain the value of thickness h of the steak.

Preferably, an identification of the size/weight of the steak is to perform a field-of-view correction on the upper surface area $S_1$ of the steak, and adopt a method of grid division on a bakeware/grill plane to obtain an upper surface area S of the steak by measuring the number of grids occupied by the area $S_1$; then according to the upper surface area S and a value of the thickness h obtained, and according to a formula V=S×h to estimate an approximate effective volume of the steak; the approximate effective volume V may correspond to the size or weight of the steak.

Preferably, an identification of a degree of the fattiness is based on after a field-of-view correction, the lean meat area $S_{1-1}$ and the fatty meat area $S_{1-2}$ on the steak type are identified, and a lean meat/fat meat ratio $Z=S_{1-1}/S_{1-2}$ is calculated to characterize a fattiness and leanness of the steak.

Preferably, the infrared temperature sensor measures an initial temperature $T_0$ of a surface of the steak, and transmits a signal to the intelligent menu control system; during a baking process a temperature T of the steak is monitored, setting an overload temperature value $T_x$ to prevent a burnt; the thermocouple temperature sensor monitors the oven cavity temperature $T_s$, and feedbacks and adjusts an output power of an electric heating tube of the oven to maintain a set baking temperature. Preferably, the overload temperature value $T_x$ is 105° C. to 115° C.

Preferably, the variable parameters a, b, c and A are obtained by experimenters according to different steak types.

Specifically, the image analysis and processing system is formed by an image analysis processor and a signal modifier. The image information collected by the image acquisition system is segmented, counted, and analyzed by the image analysis processor, then through the signal modifier, the analysis result is converted into an electric signal and output to the control panel, matched with the preset cooking menu, so as to realize intelligent cooking. The analysis steps and methods adopted by the image analysis processor are as follows:

1. Image Segmentation

An image mode acquired by the image acquisition system is in an RGB color format, but in this format, the brightness value of the image cannot be characterized, and the side surface and the upper surface, fattiness and background cannot be effectively distinguished. Therefore, the analysis processor first converts the RGB color format into the YIQ format, where the Y value represents a brightness, the I and the Q are hue values, which represent from orange to green and from purple to yellow-green respectively; then performs calculations on YIQ values of a pixel in an image using the following formula to obtain the classification value $P_{mn}$;

$$P_{mn}=a \times Y_{mn}+b \times I_{mn}+c \times Q_{mn}+A$$

in the formula, $P_{mn}$ is a classification value of the pixel, a, b, c and A are variable parameters, so that $0 \leq P_{mn} \leq 1$; through the optimized variable parameters a, b, c and A value, the YIQ value of the pixel is substituted into the above formula for calculation, and the classification value $P_{mn}$ of each pixel in the image can be obtained. In this way, by limiting the range (threshold) of the classification value P, the steak-type image can be segmented according to the limited conditions. Due to the special positional relationship between the camera and the light source, a dark shadow area is formed on the side of the steak-type close to the camera. The background is a white bright area. The upper surface of the steak-type reflects the light source, and the brightness value is between the two. Therefore, by optimizing the values of a, b, and c and limiting the threshold of $P_{mn}$, the image can be divided into the following areas: the upper surface area $S_1$ of the steak type (according to the brightness value Y, it is further subdivided into the lean meat area $S_{1-1}$ and the fatty meat area $S_{1-2}$), the side area $S_2$ of the steak type and background $S_3$.

2. Analysis and Processing

The image is analyzed and processed by the image analysis processor, mainly to obtain the following information and parameters:

a. Type

Different types of steak (lean meat area) have different surface colors. For example, the color of chicken steak is whiter with higher brightness; the color of pork steak is light red with moderate brightness; the color of steak is dark red with lower brightness. Therefore, by limiting the threshold value of the classification value P of the pixels in lean meat area $S_{1-1}$ on the surface, the type of steak may be effectively identified.

b. Thickness

Since the distance between each pixel in the captured image and the camera is different (the pixels on the bottom and the middle are closer to the camera, and the pixels on both sides are far away from the camera), therefore, the thickness value needs to be corrected. It is necessary to first identify the lower bottom edge of the steak-type side area $S_2$, and perform a function correction on the height value of the side surface through the lower bottom edge to obtain the steak-type thickness value h.

c. Size/Weight

Due to the influence of the shooting angle of the camera and the rounded field of view, the image obtained by shooting is a curved surface. Therefore, it is necessary to perform field-of-view correction on the upper surface area $S_1$ of the steak type. Using the method of grid division on the bakeware/grill plane, by measuring the number of grids occupied by the $S_1$ area, the upper surface area S of the steak type may be obtained. According to the upper surface area S and the thickness value h obtained by the above method, the effective volume of the steak may be estimated according to the formula V=S×h. The effective volume V may correspond to the size or weight of the steak.

d. Fattiness

After the field-of-view correction, and after identifying the lean meat area $S_{1-1}$ and the fatty meat area $S_{1-2}$ on the surface of the steak type, calculate the lean/fat meat ratio, that is, $Z=S_{1-1}/S_{1-2}$, which represents the degree of fattiness of the steak.

The intelligent identification cooking system of an oven of the present invention has the following advantages:

1. The intelligent identification system of the present invention may effectively identify the parameters such as the type, thickness, size, fattiness and temperature of the steak, and automatically match the cooking menu without manual estimation and operation, and realizes intelligent cooking.

2. The intelligent identification cooking system of an oven of the present invention, relying on computer vision and identification technology, may effectively identify multiple main parameters that affect the cooking curve of steak type, replacing traditional weight sensors, thickness sensors and other independent sensing systems with complex structures, and has the advantages of simple structure, easy implementation, cost reduction, and strong applicability etc.

DETAILED DESCRIPTION

In order to better understand the present invention, the following further describes the present invention with reference to the accompanying drawings and embodiments, but the scope of protection claimed by the present invention is not limited to the scope of the embodiments.

First Embodiment

Figure 1:
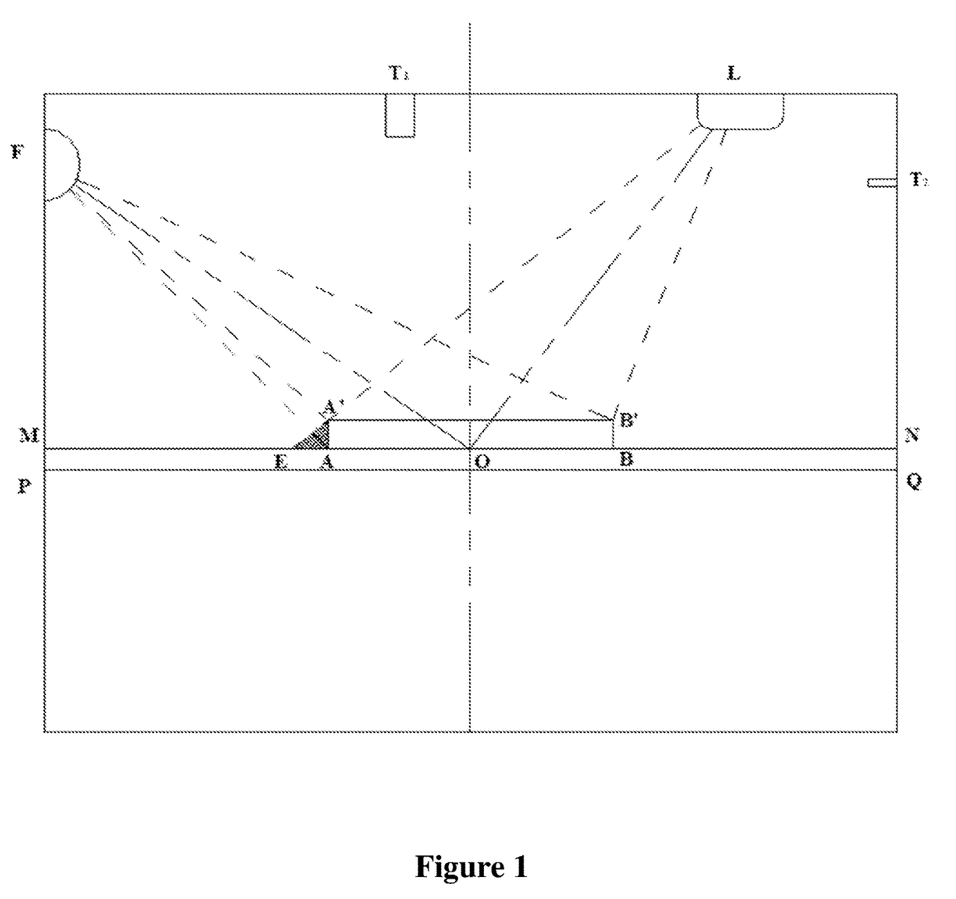
FIG. 1 is an illustrative diagram of the structure and implementation principle of the intelligent cooking system of the present invention.

As shown in FIG. 1, an intelligent identification cooking system of an oven mainly comprises an image acquisition system, an image analysis and processing system, and a temperature measurement and monitoring system; the image acquisition system is connected to the image analysis and processing system; an intelligent menu control system is connected to the image analysis and processing system and the temperature measurement and monitoring system respectively; in the figure, F represents a camera, L represents a light source, T1 represents an infrared temperature sensor, T2 represents a thermocouple temperature sensor, AA'B'B represents a steak-type food, MNQP represents the bakeware/grill, O point represents a center point of the bakeware/grill.

The image acquisition system is mainly formed by a camera F and a light source L; where the camera F is located on a side of the oven cavity, facing the center point O of the bakeware/grill, and is at 45° to the horizontal plane, that is, ∠FOM=45°. The light source L is a yellow light tube, located above the oven cavity, on the same plane as the camera F and the center line of the grill/bakeware MNQP, and the line between the light source L and the center O of the grill/bakeware is at 75° to the horizontal plane, that is, ∠LON=75°.

It should be noted that, in order to avoid overexposure of the steak-type surface in the collected image, preferably, the color of the bakeware is white, or when the grill is used for baking, white silicone oil paper is laid under the steak type.

The image analysis processing system is formed by an image analysis processor and a signal modifier. The image information collected by the image acquisition system is segmented, counted and analyzed through the image analysis processor, then the analysis result is converted into an electrical signal through the signal modifier to output to the intelligent menu control system.

Figure 2:
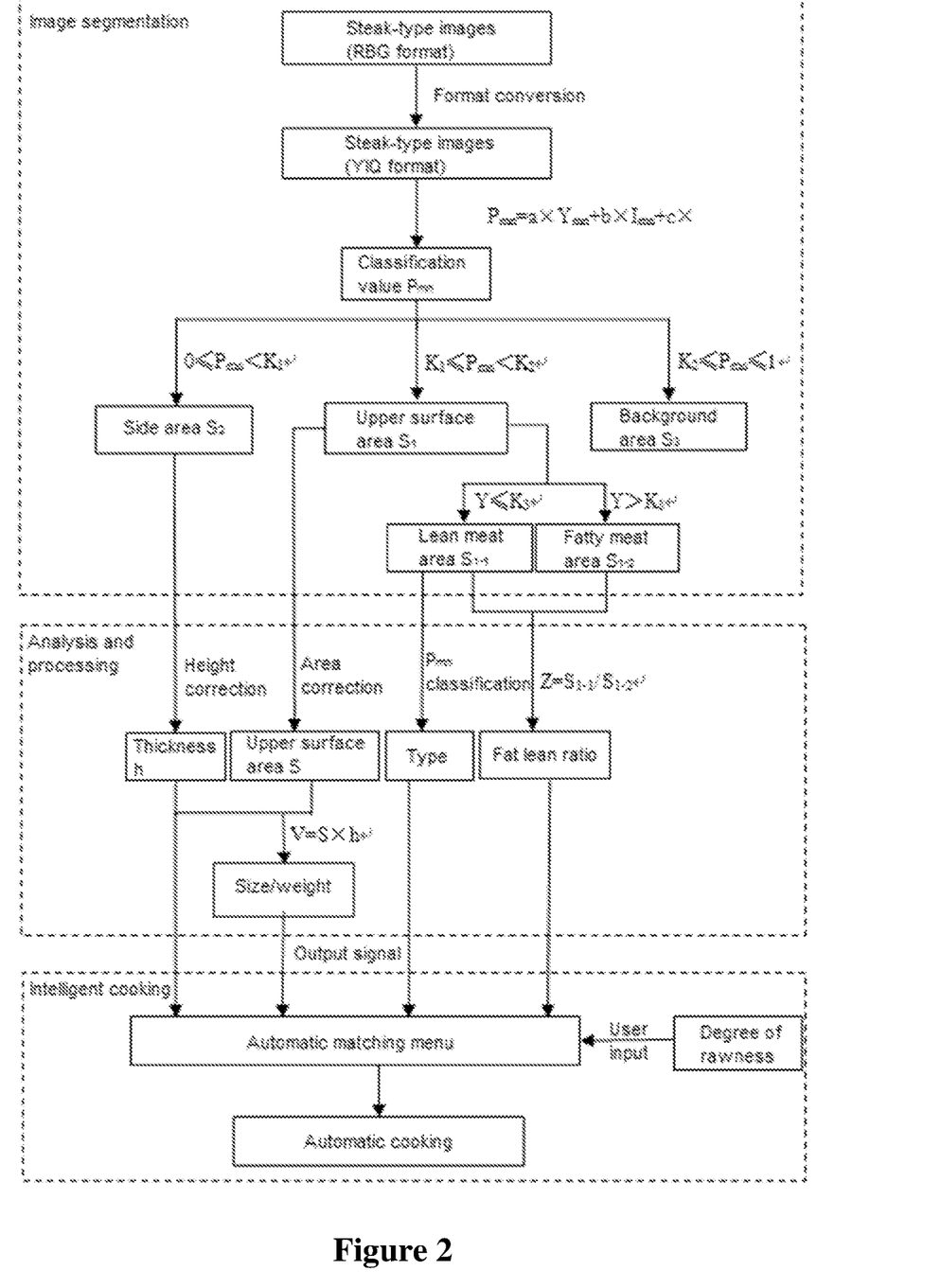
FIG. 2 is an illustrative diagram of the working principle of image processing of the intelligent cooking system of the present invention.

As shown in FIG. 2, the image analysis processor analysis steps are as follows:

I. Image Segmentation

The analysis processor first converts the collected steak-type images from RGB color format to YIQ format, where the Y value represents a brightness, the I and the Q are hue values, which represent from orange to green and from purple to yellow-green respectively; then performs calculations on YIQ values of a pixel in an image using the following formula to obtain the classification value $P_{mn}$;

$$P_{mn}=a\times Y_{mn}+b\times I_{mn}+c\times Q_{mn}+A$$

in the formula, $P_{mn}$ is the classification value of the pixel, a, b, c and A are optimized variable parameters, so that $0\leq P_{mn}\leq 1$, a, b, c and A are obtained by the experimenters according to teats of different steak-type. After substituting the YIQ value of the pixel into the above formula for calculation, the classification value $P_{mn}$ of each pixel in the image can be obtained. The threshold of each pixel $P_{mn}$ is limited, and the image is divided into the following areas: the side area $S_2$ ($0\leq P_{mn}<K_1$) of the steak, the upper surface area $S_1$ ($K_1\leq P_{mn}<K_2$) of the steak, and the background $S_3$ ($K_2\leq P_{mn}\leq 1$). According to the brightness value Y, the upper surface area $S_1$ is subdivided into a lean meat area $S_{1-1}$ ($Y\leq K_3$) and a fatty meat area $S_{1-2}$ ($Y>K_3$). Among them, $K_1$, $K_2$ and $K_3$ are optimized classification limit values.

2. Analysis and Processing

Figure 3:
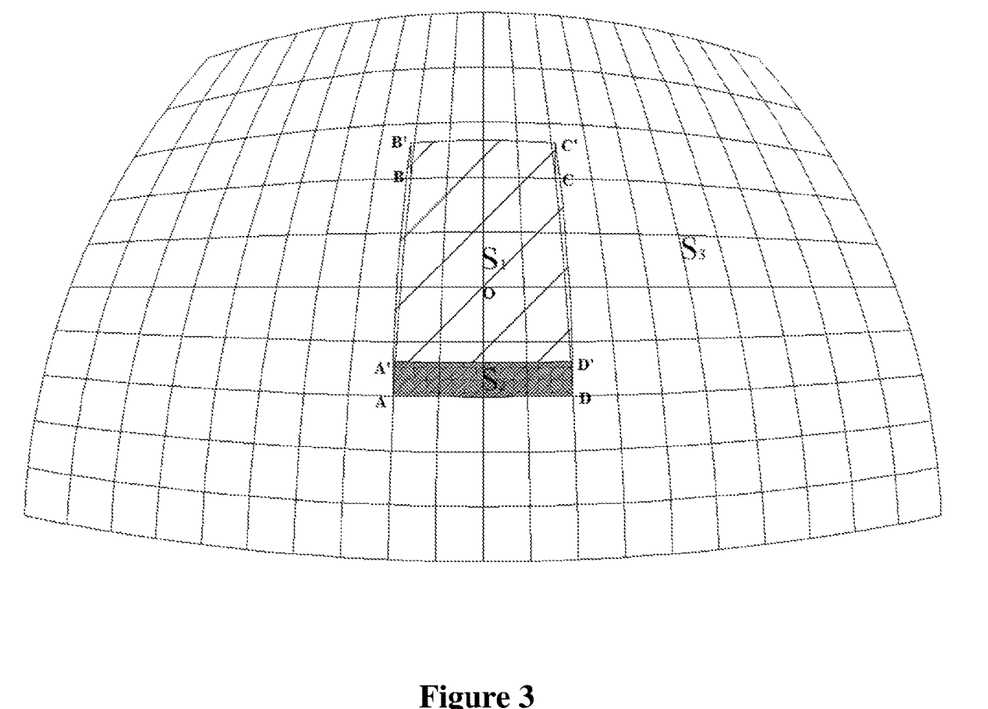
FIG. 3 is an illustrative diagram of image correction of the thickness h and the upper surface area S of the steak type by the intelligent cooking system of the present invention.

The illustrative diagram of steak-type image correction is shown in FIG. 3, where the cuboid ABCD-A'B'C'D' represents steak-type food, point O is the center of the field of view. The image is analyzed and processed by the image analysis processor, mainly to obtain the following information and parameters:

a. Type

By limiting the threshold value of the classification value $P_{mn}$ of the pixel point in the surface lean meat area $S_{1-1}$, it is possible to effectively distinguish the main steaks such as chicken steak, pork chop, and steak.

b. Thickness

First, identify the lower bottom edge of the side area $S_2$ of the steak type, and perform a function correction on the height value of the side surface through the lower bottom edge to obtain the side height of the steak type, and take the average thickness value to obtain h.

c. Size/Weight

The grid division method of the bakeware/grill plane is used to correct the area $S_1$ of the upper surface of the steak type, and the upper surface area S of the steak type is obtained by measuring the number of grids occupied by the $S_1$ area. Then according to the area S of the upper surface and the thickness value h obtained by the above method, the effective volume of the grill may be estimated according to the formula V=S×h. The effective volume V may correspond to the size or weight of the grill.

d. Fattiness

After the field-of-view correction, and after identifying the lean meat area $S_{1-1}$ and the fatty meat area $S_{1-2}$ on the surface of the steak type, calculate the lean/fat meat ratio, that is, $Z=S_{1-1}/S_{1-2}$, which represents the degree of fattiness of the steak.

As shown in FIG. 1, the oven is equipped with a temperature measurement and monitoring system. The temperature measurement and monitoring system mainly comprises an infrared temperature sensor $T_1$ and a thermocouple temperature sensor $T_2$. Among them, the infrared temperature sensor $T_1$ is used to measure the initial temperature $T_0$ of the surface of the steak type. A signal is transmitted to the intelligent menu control system, and the temperature T of the steak type during the baking process is monitored, by setting the overload temperature value $T_x=110°$ C. to prevent burnt; the thermocouple temperature sensor $T_2$ is used to monitor the temperature $T_s$ inside the oven cavity, and feedback to adjust the output power of the oven electric heating tube to maintain the set baking temperature.

The intelligent menu control system collects the signals from the image analysis and processing system and the temperature measurement system. The type of the steak obtained through analysis is matched with a preset standard cooking curve, then calibrate the standard cooking curve with the thickness, the size/weight, the fattiness and an initial temperature to obtain a calibrated cooking curve; at the same time, a cooking control program is obtained according to a rawness requirement input by a user; finally, the control program is output to a control terminal and executed to realize an intelligent cooking.

Table 1 shows the intelligent cooking effect of cooking some steak types using this embodiment. Table 1 lists some of the different type, thickness, weight, fattiness and initial temperature of steak type, the cooking effect achieved through the different rawness degree set by users. The cooking results in Table 1 show that the intelligent identification cooking system of oven of the present invention may effectively perform intelligent identification on the basic characteristics of steak type, match the cooking curve, and at the same time automatically obtain the cooking conditions according to rawness setting by the users, and finally achieve intelligent cooking, and achieve satisfactory cooking results.

TABLE 1

Some cooking effects of intelligent identification cooking system of an oven

| Type | Initial condition parameters | Rawness setting | Intelligent cooking conditions | Cooking effect |
| --- | --- | --- | --- | --- |
| Sirloin | thickness 1.5 cm, weight 100 g, fat lean ratio about 1:9, initial temperature 20° C. | Medium rare | 220° C., 4 min 30 s | The centre area of the cut section is red, the middle area is pink, the outer area is grey, and the center temperature is 57° C. |
| Sirloin | thickness 1.5 cm, weight 100 g, fat lean ratio about 1:9, initial temperature 20° C. | Medium | 220° C., 5 min 30 s | The centre area of the cut section is pink, the outer layer is grey, and the centre temperature is 63° C. |
| Sirloin | thickness 1.5 cm, weight 100 g, fat lean ratio about 1:9, initial temperature 20° C. | Medium well | 220° C., 6 min 30 s | There is still a small amount of pink in the center of the cut section, and the center temperature is 70° C. |
| Sirloin | thickness 1.5 cm, weight 100 g, fat lean ratio about 1:9, initial temperature 20° C. | Well done | 220° C., 7 min 30 s | The cut section is completely grey, the center temperature is 77° C. |
| Sirloin | thickness 1.5 cm, weight 100 g, fat lean ratio about 1:9, initial temperature −12° C. | Medium well | 220° C., 8 min 30 s | There is still a small amount of pink in the center of the cut section, and the center temperature is 70° C. |
| Sirloin | thickness 1.0 cm, weight 60 g, fat lean ratio about 1:9, initial temperature 20° C. | Medium well | 220° C., 4 min 30 s | There is still a small amount of pink in the center of the cut section, and the center temperature is 70° C. |
| Sirloin | thickness 2.0 cm, weight 150 g, fat lean ratio about 1:9, initial temperature 20° C. | Medium well | 220° C., 10 min 30 s | There is still a small amount of pink in the center of the cut section, and the center temperature is 70° C. |

TABLE 1-continued

Some cooking effects of intelligent identification cooking system of an oven

| Type | Initial condition parameters | Rawness setting | Intelligent cooking conditions | Cooking effect |
|---|---|---|---|---|
| Sirloin | thickness 2.0 cm, weight 100 g, fat lean ratio about 1:9, initial temperature −12° C. | Medium well | 220° C., 10 min 30 s | There is still a small amount of pink in the center of the cut section, and the center temperature is 70° C. |
| Beef short ribs | thickness 1.5 cm, weight 100 g, fat lean ratio about 3:7, initial temperature 20° C. | Medium well | 220° C., 6 min 30 s | There is still a small amount of pink in the center of the cut section, and the center temperature is 70° C. |
| Beef short ribs | thickness 2.0 cm, weight 150 g, fat lean ratio about 3:7, initial temperature −12° C. | Well done | 220° C., 12 min 30 s | The cut section is completely gray, the center temperature is 77° C. |
| Pork chop | thickness 1.5 cm, weight 100 g, all lean, initial temperature 20° C. | Well done | 250° C., 7 min | The cut section completely turns grey white, the center temperature is 77° C. |
| Chicken breast steak | thickness 1.5 cm, weight 100 g, all lean, initial temperature 20° C. | Well done | 240° C., min | The cut section becomes completely white, the center temperature is 77° C. |

Second Embodiment

As shown in FIG. 1, an intelligent identification cooking system of an oven mainly comprises an image acquisition system, an image analysis and processing system, and a temperature measurement and monitoring system; the image acquisition system is connected to the image analysis and processing system; an intelligent menu control system is connected to the image analysis and processing system and the temperature measurement and monitoring system respectively; in the figure, F represents a camera, L represents a light source, $T_1$ represents an infrared temperature sensor, $T_2$ represents a thermocouple temperature sensor, AA'B'B represents a steak-type food, MNQP represents the bakeware/grill, O point represents a center point of the bakeware/grill.

Among them, the camera F is located on the oven door, facing the center point O of the bakeware/grill, and is at 30° to the horizontal plane, that is ∠FOM=30°. The light source L is a white lamp tube, located above the oven cavity, on the same plane as the camera F and a center line of the grill/bakeware MNQP, and the line between the light source L and the center O of the grill/bakeware is at 75° to the horizontal plane, that is, ∠LON=75°.

In order to avoid overexposure of the steak-type surface in the collected image, preferably, the color of the bakeware is white, or when the grill is used for baking, white silicone oil paper is laid under the steak type.

The image analysis processing system is mainly formed by an image analysis processor and a signal modifier. The image information collected by the image acquisition system is segmented, counted and analyzed through the image analysis processor, then the analysis result is converted into an electrical signal through the signal modifier to output to A control panel to match a preset menu to realize smart cooking. The analysis steps and methods adopted by the image analysis processor are shown in FIG. 2 and are the same as those in the first embodiment.

The oven is equipped with a temperature measurement and monitoring system. The temperature measurement and monitoring system mainly comprises an infrared temperature sensor $T_1$ and a thermocouple temperature sensor $T_2$. Among them, the infrared temperature sensor $T_1$ is used to measure the initial temperature $T_0$ of the surface of the steak type. A signal is transmitted to the intelligent menu control system, and the temperature T of the steak type during the baking process is monitored, by setting the overload temperature value $T_x$=115° C. to prevent burnt; the thermocouple temperature sensor $T_2$ is used to monitor the temperature $T_s$ inside the oven cavity, and feedback to adjust the output power of the oven electric heating tube to maintain the set baking temperature.

The intelligent menu control system collects the signals from the image analysis and processing system and the temperature measurement system. The type of the steak obtained through analysis is matched with a preset cooking curve, then calibrate the cooking curve with the thickness, the size/weight, the fattiness and an initial temperature to obtain a calibrated cooking curve; at the same time, a cooking control program is obtained according to a rawness requirement input by a user; finally, the control program is output to a control terminal and executed to realize an intelligent cooking.

Using this embodiment to cook steak type can achieve intelligent cooking effects that meet the expectations of users.

The invention claimed is:

1. An intelligent identification cooking system of an oven comprising an image acquisition system, an image analysis and processing system, and a temperature measurement and monitoring system, wherein the image acquisition system is connected to the image analysis and processing system, and an intelligent menu control system is connected to the image analysis and processing system and the temperature measurement and monitoring system respectively;

wherein the image acquisition system comprises a camera and a light source, wherein the camera is used to collect image information and the light source is a fixed light source which provides a stable lighting environment for the camera;

wherein the image analysis and processing system comprises an image analysis processor and a signal modifier and an image mode acquired by the image acquisition system is in an RGB color format, wherein the analysis processor first converts the RGB color format into a YIQ format, where the Y value represents a brightness, the I and the Q are hue values representing from orange to green and from purple to yellow-green respectively, wherein the analysis processor is configured to perform calculations on YIQ values of a pixel in an image using Formula 1 to obtain a pixel classification value Pmn:

$$P_{mn} = a \times Y + b \times I + c \times Q + A \quad \text{[Formula 1]}$$

wherein in Formula 1 a, b, c and A are variable parameters, and $0 \leq P_{mn} \leq 1$;

wherein by limiting a threshold of the pixel classification value $P_{mn}$, a steak type image is segmented, and the image is divided into an upper surface area ($S_1$) of the steak type, a side area ($S_2$) of the steak type, and a background ($S_3$), wherein the upper surface area ($S_1$) is subdivided into a lean meat area ($S_{1-1}$) and a fatty meat area ($S_{1-2}$) according to the brightness value Y, and wherein a type of a steak is identified by thickness h, size or weight, and fattiness;

wherein the temperature measurement and monitoring system comprises an infrared temperature sensor and a thermocouple temperature sensor, which are respectively used to measure and monitor a food surface temperature and an oven cavity temperature; and wherein the intelligent menu control system collects signals from the image analysis and processing system and the temperature measurement system and the type of the steak obtained through analysis is matched with a preset standard cooking curve, the standard cooking curve being calibrated with the thickness, the size or weight, the fattiness and an initial temperature to obtain a calibrated cooking curve;

wherein a cooking control program is simultaneously obtained according to a rawness requirement input by a user and the control program is output to a control terminal and executed to perform cooking.

2. The intelligent identification cooking system according to claim 1, characterized in that, the camera is directly opposite to a center position of a bakeware/grill on which food is placed, and forms an angle of 30° to 60° with a horizontal plane.

3. The intelligent identification cooking system according to claim 1, characterized in that, the light source is located above an oven cavity, on a same plane as the camera and a center line of the grill/bakeware; and the light source and the camera are fixed respectively on both sides of another center line of the grill/bakeware.

4. The intelligent identification cooking system according to claim 1, characterized in that, the light source is a white or yellow light source and an angle between a connecting line from the light source to a center of the bakeware/grill and a horizontal plane is 60° to 90°.

5. The intelligent identification cooking system according to claim 1, characterized in that, an identification of the type of the steak is performed by limiting the threshold value of the pixel classification value Pmn of pixels in a surface of the lean meat area ($S_{1-1}$).

6. The intelligent identification cooking system according to claim 1, characterized in that, an identification of a value of the thickness h of the steak is performed by to identifying a bottom edge of the side area ($S_2$) of the steak type and correcting a height value of a side surface by a function of the bottom edge to obtain the value of thickness (h) of the steak.

7. The intelligent identification cooking system according to claim 6, characterized in that, the size or weight of the steak is identified by performing a field-of-view correction on the upper surface area ($S_1$) of the steak by obtaining an upper surface area (S) of the steak by measuring a number of grids occupied by the area ($S_1$) on a bakeware/grill plane, then according to the upper surface area (S) and a value of the thickness (h) obtained, using a formula $V = S \times h$ to estimate an approximate effective volume of the steak, wherein the approximate effective volume V corresponds to the size or weight of the steak.

8. The intelligent identification cooking system according to claim 1, characterized in that, a degree of fattiness is identified based on a field-of-view correction by identifying the lean meat area ($S_{1-1}$) and the fatty meat area ($S_{1-2}$) on the steak type, wherein a lean meat/fat meat ratio $Z = S_{1-1}/S_{1-2}$ is calculated to characterize a fattiness and leanness of the steak.

9. The intelligent identification cooking system according to claim 1, characterized in that, the infrared temperature sensor measures an initial temperature $T_0$ of a surface of the steak and transmits a signal to the intelligent menu control system; during a baking process a temperature T of the steak is monitored, setting an overload temperature value $T_x$ to prevent burning; and the thermocouple temperature sensor monitors the oven cavity temperature $T_s$ and adjusts an output power of an electric heating tube of the oven to maintain a set baking temperature.

10. The intelligent identification cooking system according to claim 1, characterized in that, the variable parameters a, b, c and A are obtained by experimenters according to different steak types.

* * * * *